United States Patent
Hong et al.

(10) Patent No.: US 7,349,413 B2
(45) Date of Patent: Mar. 25, 2008

(54) METHOD AND APPARATUS FOR COMMUNICATING BETWEEN COORDINATOR-BASED WIRELESS NETWORKS CONNECTED THROUGH A BACKBONE NETWORK

(75) Inventors: Jin-woo Hong, Seoul (KR); Dae-gyu Bae, Suwon-si (KR); Hyun-ah Sung, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 200 days.

(21) Appl. No.: 11/113,265

(22) Filed: Apr. 25, 2005

(65) Prior Publication Data
US 2005/0237993 A1  Oct. 27, 2005

(30) Foreign Application Priority Data
Apr. 26, 2004  (KR) .................. 10-2004-0028665

(51) Int. Cl.
*H04L 12/40* (2006.01)
(52) U.S. Cl. .................. 370/401; 370/310.2; 370/312; 370/320; 370/328; 370/341; 370/348; 370/349; 370/351; 370/449; 370/468
(58) Field of Classification Search ................ 370/349, 370/310.2, 312, 320, 328, 338, 341, 348, 370/351, 389, 392, 395.21, 395.5, 449, 468, 370/401
See application file for complete search history.

(56) References Cited

U.S. PATENT DOCUMENTS 5,220,562 A * 6/1993 Takada et al. .............. 370/404
6,879,574 B2 * 4/2005 Naghian et al. ............ 370/338
6,925,064 B2 * 8/2005 Hester et al. ............... 370/255
7,016,336 B2 * 3/2006 Sorensen .................... 370/351
2002/0061009 A1  5/2002 Sorensen
2003/0016636 A1 * 1/2003 Tari et al. ................... 370/338
2003/0142643 A1 * 7/2003 Yang et al. ................. 370/328
2003/0152059 A1 * 8/2003 Odman ....................... 370/338
2003/0235175 A1 * 12/2003 Naghian et al. ............ 370/338
2005/0152305 A1 * 7/2005 Ji et al. ...................... 370/328
2005/0221752 A1 * 10/2005 Jamieson et al. ............... 455/1
2006/0080460 A1 * 4/2006 Kobayashi et al. ......... 709/238

FOREIGN PATENT DOCUMENTS

KR  2003/0084555 A  11/2003
WO  WO 01/97447 A2  12/2001

OTHER PUBLICATIONS

"Standards Text for Child and Neighbor Piconet Functionality", IEEE P802.15 Working Group for Wireless Personal Area Networks (WPANS), Bob Huang, et al., Nov. 6, 2001.

* cited by examiner

*Primary Examiner*—Matthew Anderson
*Assistant Examiner*—Shaima Q. Aminzay
(74) *Attorney, Agent, or Firm*—Sughrue Mion, PLLC

(57) ABSTRACT

A method and an apparatus for communication between multiple coordinator-based wireless networks connected through a wired backbone network by means of a wired/wireless relay device. In the communication method, communication is performed between coordinator-based wireless networks in a network including the coordinator-based wireless networks connected through a wired backbone network by means of a combination of identification information of a network device and identification information of a coordinator-based wireless network including the network device.

6 Claims, 13 Drawing Sheets

Coordinator-based ad-hoc wireless network

Ad-hoc wireless network without coordinator

FIG. 9b

| octets: 1 | 2 | ... | 1 | 2 | 1 | 1 |
|---|---|---|---|---|---|---|
| Channel index n | Piconet ID n | ... | Channel index 1 | Piconet ID 1 | Length (=3*n) | Element ID |

FIG. 10a

| bit : b15-b12 | b11 | b10 | b9 | b8-b7 | b6 | b5-b3 | b2-b0 |
|---|---|---|---|---|---|---|---|
| Reserved | Destination piconet type | More data | Retry | ACK policy | SEC | Frame type | Protocol version |

Converted type of frame control field

| 1 | 3 | 1 | 2 | 1 | 2 | 2 |
|---|---|---|---|---|---|---|
| Stream index | Fragmentation control | Source device ID | Source piconet ID | Destination device ID | Destination piconet ID | Frame control |

Converted type of MAC header

METHOD AND APPARATUS FOR COMMUNICATING BETWEEN COORDINATOR-BASED WIRELESS NETWORKS CONNECTED THROUGH A BACKBONE NETWORK

This application claims priority of Korean Patent Application No. 10-2004-0028665 filed on Apr. 26, 2004 in the Korean Intellectual Property Office, the disclosure of which is incorporated herein in its entirety by reference.

BACKGROUND OF THE INVENTION

1. Field of the Invention

The present invention relates to a method and an apparatus for communication between coordinator-based wireless networks connected through a backbone network, and more particularly, to a method and an apparatus for communication between multiple coordinator-based wireless networks connected through a wired backbone network by means of a wired/wireless relay device.

2. Description of the Related Art

With the development of communication and network technologies, recent network environments have been in the transition from wired network environments using wired media such as coaxial cables or optical cables to wireless network environments using radio signals over various frequency bands. Accordingly, computing devices (hereinafter referred to as "wireless network devices") have been developed, which include wireless network interface modules, have mobility, and perform specific functions by processing various information. In addition, wireless network technologies have appeared, which allow such wireless network devices to efficiently communicate with each other.

Generally, a wireless network may be classified into the following two types of networks.

First, as shown in FIG. 1, there is a type of wireless network including an access point, which is called an infrastructure mode wireless network.

Further, as shown in FIG. 2, there is another type of wireless network including no access point, which is called an ad-hoc mode wireless network.

In the infrastructure mode wireless network, an access point performs a relay function of transmitting data in order to connect a wireless network to a wired network or to allow wireless network devices to be communicated with each other in a wireless network. Accordingly, all data must pass through the access point.

Next, the ad-hoc mode wireless network is formed only when a network is required randomly. In the ad-hoc mode wireless network, wireless network devices in a single wireless network directly exchange data with each other without passing through a relay device such as the access point.

Such a network may be classified into two types of networks. In a first network type, a wireless network device designated randomly among wireless network devices belonging to a single wireless network functions as a coordinator which assigns a time period (hereinafter referred to as "a channel time"), during which data can be transmitted to the other wireless network devices. Further, the other wireless network devices can transmit data only for a determined channel time. In a second network type, there is no wireless network device functioning as a coordinator, and all wireless network devices can transmit data whenever they want to transmit data.

Herein, in the former case, that is, in the network type (hereinafter referred to as "a coordinator-based wireless network") in which a wireless network device functioning as a coordinator exists, an independent single wireless network is formed on the basis of the coordinator. Further, when a plurality of coordinator-based wireless networks exist in a predetermined area, each of the coordinator-based wireless networks has unique identification information in order to be distinguished from other coordinator-based wireless networks.

Accordingly, wireless network devices belonging to a specific coordinator-based wireless network can exchange data with other wireless network devices in the same coordinator-based wireless network for a channel time, which is determined by a coordinator, but cannot communicate with wireless network devices belonging to other coordinator-based wireless networks.

For instance, as shown in FIG. 3, in a home network system including three coordinator-based wireless networks 310 to 330, it is assumed that the wireless network 310 is constructed in a first-floor living room, the wireless network 320 is constructed in a second-floor study room, and the wireless network 330 is constructed in a first-floor bedroom.

Herein, a user in the second-floor study room cannot see a movie stored in a media server 315 in the first-floor living room by means of a portable dynamic image player 325 in the second-floor study room because there is no method for enabling communication between the wireless network 310 and the wireless network 320. Accordingly, the user must come down to the first-floor living room to see the movie.

Such a problem is caused because of a limitation in a transmission distance of radio waves, an absence of information on other coordinator-based wireless networks and an assignment problem of a channel time, etc.

Accordingly, it is necessary to construct a new network topology for exchanging data between wireless network devices belonging to different coordinator-based wireless networks.

SUMMARY OF THE INVENTION

Accordingly, the present invention has been made to solve the above-mentioned problems occurring in the related art, and it is an object of the present invention to provide an apparatus and a method, which enable wireless network devices belonging to coordinator-based wireless networks to exchange data with each other by interconnecting the different coordinator-based wireless networks through a wired backbone.

An object of the present invention is not limited to the aforementioned object, and other unwritten objects will become apparent to and understood by those skilled in the art through the following description.

Consistent with an aspect of the present invention, there is provided a communication method between coordinator-based wireless networks connected through a backbone network comprising acquiring identification information of a second coordinator-based wireless network from a relay device connecting a first coordinator-based wireless network to a backbone network, the second coordinator-based wireless network including a destination network device; generating a frame containing the identification information; and transmitting the generated frame to the relay device.

Consistent with another aspect of the present invention, there is provided a communication method between coordinator-based wireless networks connected through a backbone network comprising receiving a frame containing identification information of a coordinator-based wireless network from a relay device connecting the coordinator-based wireless network including the relay device to a backbone network; extracting the identification information from the received frame; and processing the received frame according to the extracted identification information.

Consistent with yet another aspect of the present invention, there is provided a communication method between coordinator-based wireless networks connected through a backbone network comprising managing identification information of multiple coordinator-based wireless networks; providing a network device with the identification information of a coordinator-based wireless network to which a destination network device belongs; converting a frame containing the identification information, which has been received from the network device, to a frame supported by a backbone network; and transmitting the converted frame to the backbone network.

Consistent with yet another aspect of the present invention, there is provided a communication method between coordinator-based wireless networks connected through a backbone network, the communication method comprising managing identification information of multiple coordinator-based wireless networks; converting a frame containing the identification information received from a backbone network to a frame supported by a coordinator-based wireless network; and transmitting the converted frame to a network device in the coordinator-based wireless network.

Consistent with yet another aspect of the present invention, there is provided a network device for communication between coordinator-based wireless networks connected through a backbone network, the network device comprising: a control module for acquiring identification information of a second coordinator-based wireless network from a relay device connecting a first coordinator-based wireless network to a backbone network, the second coordinator-based wireless network including a destination network device, and generating a frame containing the identification information; a transceiving module for transmitting the frame generated by the control module; and a storage module for storing the frame generated by the control module or the frame received from the transceiving module.

Consistent with yet another aspect of the present invention, there is provided a network device for communication between coordinator-based wireless networks connected through a backbone network, the network device comprising: a transceiving module for receiving a frame containing identification information of a coordinator-based wireless network from a relay device connecting the coordinator-based wireless network to a backbone network; a control module for extracting the identification information from the frame received from the transceiving module, and processing the frame according to the extracted identification information; and a storage module for storing the frame received from the transceiving module or the frame processed by the control module.

Consistent with yet another aspect of the present invention, there is provided a wired/wireless relay device for communication between coordinator-based wireless networks connected through a backbone network, the wired/wireless relay device comprising: a transceiving module for providing a network device with identification information of a coordinator-based wireless network including a destination network device, receiving a frame containing the identification information from the network device, and transmitting the received frame to the backbone network; a control module for managing the identification information of the coordinator-based wireless network, and converting the frame of the coordinator-based wireless network, which contains the identification information and has been received from the transceiving module, to a frame supported by the backbone network; and a storage module for storing the frame provided by the transceiving module, the frame converted by the control module, and the identification information managed by the control module.

Consistent with yet another aspect of the present invention, there is provided a wired/wireless relay device for communication between coordinator-based wireless networks connected through a backbone network, the wired/wireless relay device comprising: a transceiving module for receiving a frame containing identification information of a coordinator-based wireless network including a destination network device from a backbone network, and transmitting the received frame to a network device; a control module for managing the identification information of the coordinator-based wireless network, and converting the frame of the backbone network received from the transceiving module to a frame supported by the coordinator-based wireless network; and a storage module for storing the frame provided by the transceiving module, the frame converted by the control module, and the identification information managed by the control module.

BRIEF DESCRIPTION OF THE DRAWINGS

The above and other objects, features and advantages of the present invention will be more apparent from the following detailed description taken in conjunction with the accompanying drawings, in which:

FIG. 9b is a view showing a structure of an information element according to one exemplary embodiment of the present invention, which is sent from a wired/wireless bridge to a piconet coordinator when piconet IDs overlap with each other in a WPAN;

FIGS. 10a and 10b are views showing a structure of a converted frame, according to one exemplary embodiment of the present invention, which contains identification information of a WPAN to which a destination device belongs;

DETAILED DESCRIPTION OF THE PREFERRED EMBODIMENTS

Figure 1:
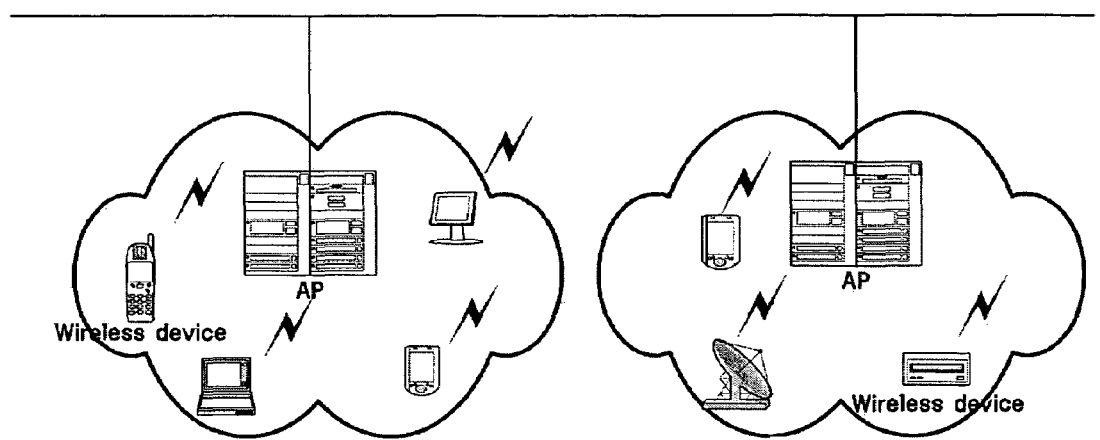
FIG. 1 is a view showing an infrastructure mode wireless network.
Figure 2:
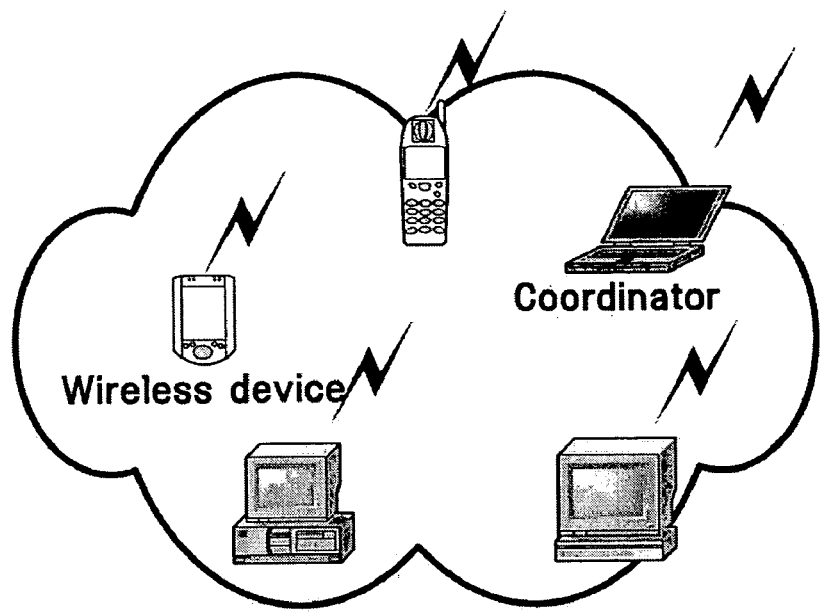
FIG. 2 is a view showing an ad-hoc mode wireless network.
Figure 2:
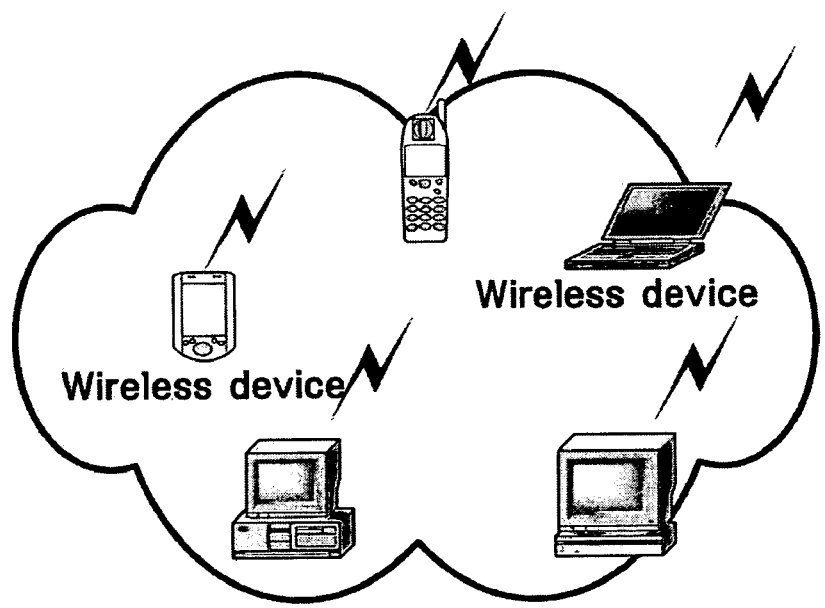
Figure 3:
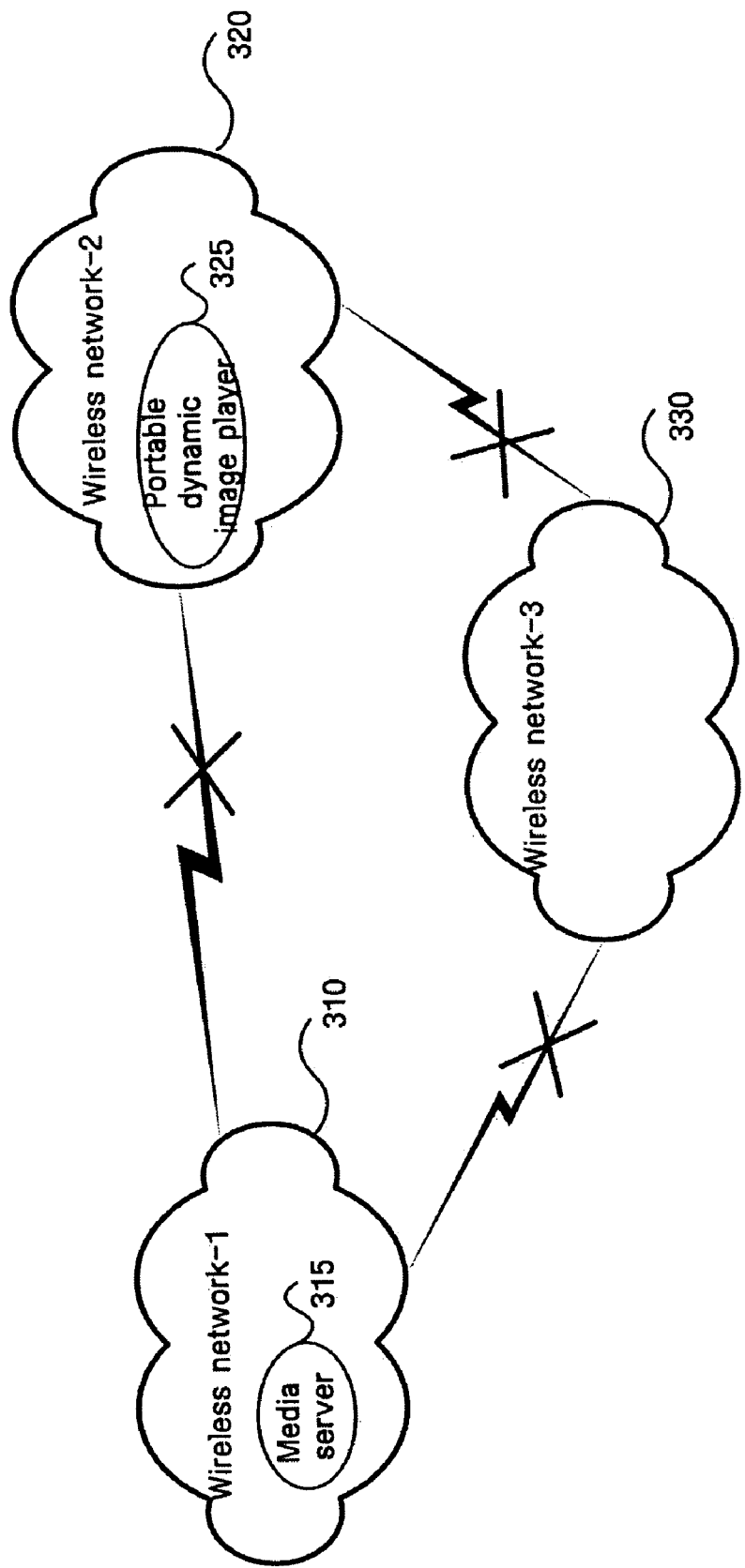
FIG. 3 is a view showing a home network system including multiple coordinator-based wireless networks.

Hereinafter, embodiments of the present invention will be described in detail with reference to the accompanying drawings.

Advantages and features of the present invention, and methods for achieving them will be apparent to those skilled in the art from the detailed description of the embodiments together with the accompanying drawings. However, the scope of the present invention is not limited to embodiments disclosed in the specification, and the present invention can be realized in various types. The described present embodiments are presented only for disclosing exemplary embodiments of the present invention and helping those skilled in the art to understand the scope of the present invention, and the present invention is defined only by the scope of the claims. Additionally, the same reference numerals are used to designate the same elements throughout the specification and drawings.

Hereinafter, an exemplary embodiment of the present invention will be described with reference to the accompanying drawings.

In a wireless network, the Institute of Electrical and Electronics Engineers (hereinafter referred to as "IEEE") 802.15.3 has proposed a standard regarding a PHY layer corresponding to a physical layer and a medium access control (hereinafter referred to as "an MAC") layer corresponding to a data link layer, among an open system interconnection (OSI) 7 layer with respect to a network model published by an international standard organization (ISO).

For easy understanding of the present invention, an exemplary embodiment for a coordinator-based wireless network will be described by way of example. The coordinator-based wireless network is based on a wireless personal area network (hereinafter referred to as "a WPAN") conforming to an IEEE 802.15.3 standard, and connects another type of network different from a coordinator-based wireless network by using a wired backbone on the basis of an MAC layer. Accordingly, a network system can be established in which data can be exchanged between network devices belonging to different types of networks.

Figure 4:
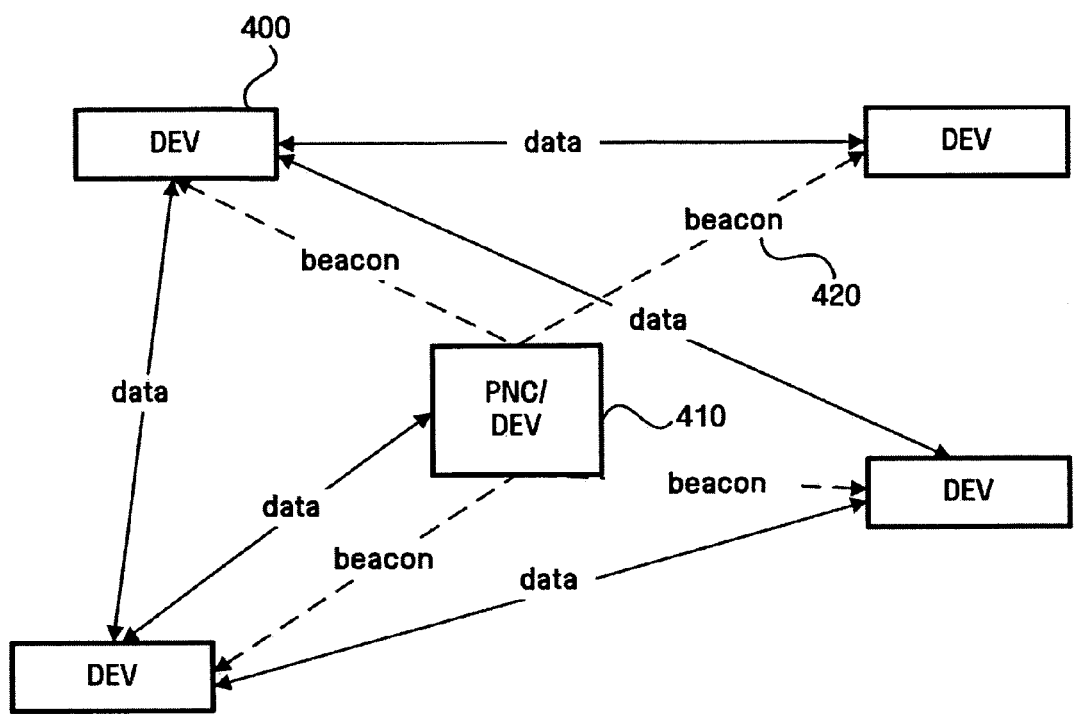
FIG. 4 is a block diagram showing a construction of a general WPAN according to an IEEE 802.15.3 standard specification.

FIG. 4 is a block diagram showing a construction of a general WPAN according to an IEEE 802.15.3 standard specification.

An ultra wideband (UWB) is a radio technology for transmitting a large quantity of digital data with low power over a short distance through a wide spectrum frequency, and a radio technology developed for military purposes by the US Department of Defense. Standardization for the ultra wideband is currently being in progress by the IEEE 802.15.3, that is, a working group for establishing a WPAN standard. The IEEE 802.15.3 deals with a PHY and an MAC, and researches for an improvement method of the MAC even between the PHY and the MAC have been actively developed in the industry.

The IEEE 802.15.3 MAC features that the formation of a wireless network is quick. Further, the IEEE 802.15.3 MAC is not based on an access point but an ad-hoc network called a piconet based on a coordinator called a piconet coordinator.

A piconet is a wireless ad-hoc data communication system which allows multiple independent data devices to communicate with each other. Piconets are different from other types of data networks in that data communication is generally limited to a small area around a person or a thing. A piconet typically encompasses an area within a radius of about 10 m around a person or a thing, which may be in a motionless state or a moving state.

As shown in FIG. 4, a piconet according to the IEEE 802.15.3 standard specification includes multiple elements, and a basic element is a device 400. One device is required to function as a piconet coordinator. A piconet coordinator 410 provides a basic timing for a piconet by means of a beacon frame 420 containing information on the piconet. Further, a piconet coordinator manages a requirement condition for quality of service (QoS), a power saving mode, and an access control regarding a piconet.

A piconet is formed when a 802.15.3 device capable of acting as a piconet coordinator starts to transmit a beacon frame. Accordingly, even when there is no device coupled thereto, a piconet coordinator sending a beacon frame is considered to be one piconet.

When data to be transmitted exist, each device of a piconet requests a piconet coordinator to perform a channel time allocation (CTA). Then, the piconet coordinator allocates a channel time to the devices having requested the channel time allocation and broadcasts a beacon frame containing channel time allocation information to all devices. The devices having received the beacon frame containing the channel time allocation information transmit data frames stored therein to a destination device when channel times allocated to the devices arrive.

Hereinafter, the terms defined in a WPAN are used for consistency purposes.

Figure 5:
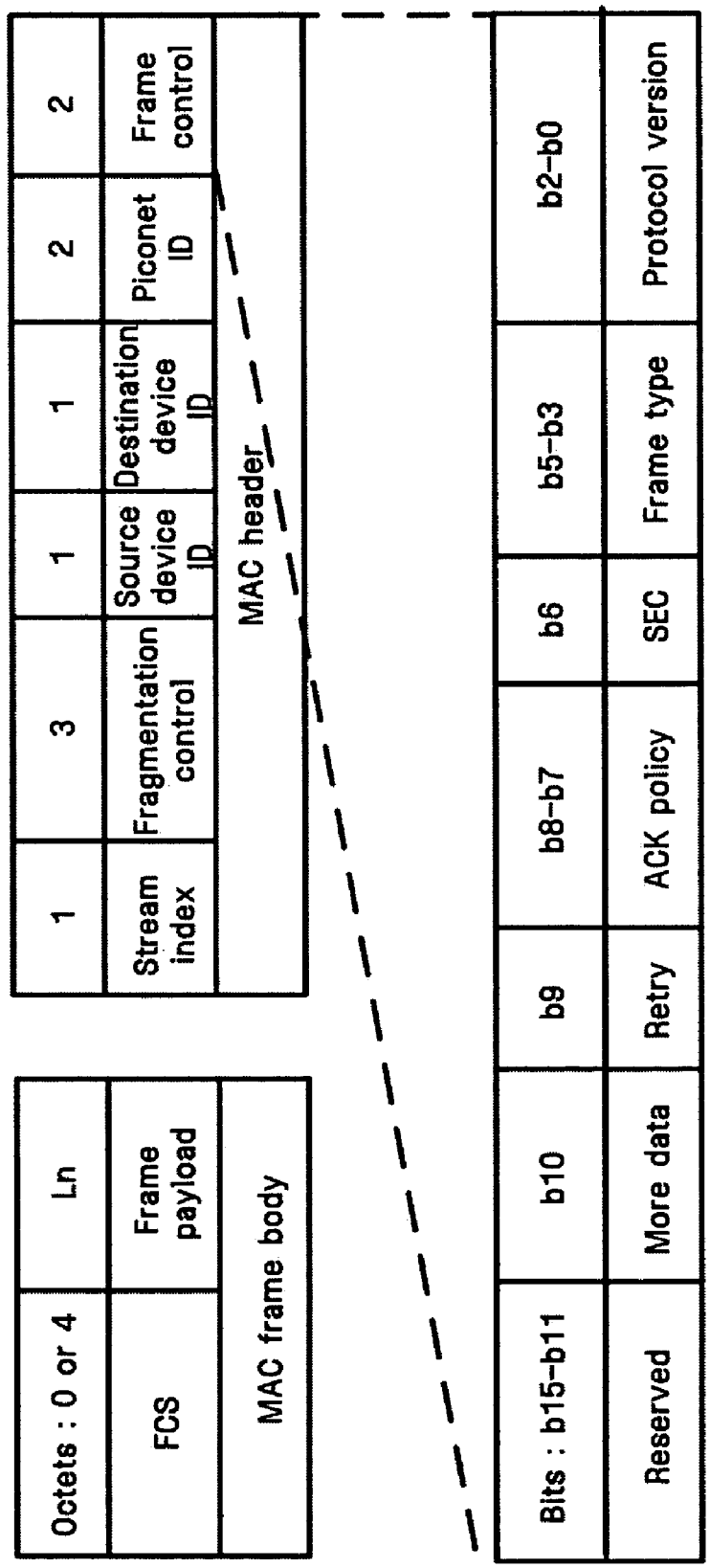
FIG. 5 is a view showing a structure of a general frame according to an IEEE 802.15.3 standard specification.

FIG. 5 is a view showing a structure of a general MAC frame according to an IEEE 802.15.3 standard specification.

A MAC frame format, as shown in FIG. 5, includes a set of fields having a fixed sequence in all frames. Each MAC frame basically includes a MAC header and a MAC frame body. The MAC frame body includes a frame payload having a variable length and a frame check sequence (FCS).

Hereinafter, the construction of the MAC header will be described.

First, a frame control field includes a protocol version, a frame type an SEC, an ACK policy, a retry, more data, and reserved fields.

A protocol version field includes protocol version information on the 802.15.3 standard. When a frame having a protocol version higher than that supported by a device is received, the received frame may be discarded without informing a source device of the reception of the frame.

A frame type field represents the type of a transmitted frame. The frame type is shown in the following table.

Type Value

| Type value<br>B5 b4 b3 | Frame type description |
|---|---|
| 000 | Beacon frame |
| 001 | Immediate ACK frame |
| 010 | Delayed ACK frame |
| 011 | Command frame |

-continued

| Type value B5 b4 b3 | Frame type description |
|---|---|
| 100 | Data frame |
| 101-111 | Reserved |

An SEC bit is set to have a value of 1 when the frame body is protected by a security ID (SECID) by means of a specific key. Otherwise, the SEC bit is set to have a value of 0. Herein, frames containing the SEC bit set to have a value of 1_use a security frame type. An ACK policy field is used for showing a type of a confirmation process required to be performed by a receiver. A retrial bit is set to have a value of 1 when a frame is a data frame or command frame for retransmitting an already transmitted frame. Further, the retrial bit is set to have a value of 0 in other frames. A more data bit is set to have a value of 0 when a device does not use the remaining channel time of a channel time allocation. Further, the more data bit is set to have a value of 0 in the last frame of an expansion beacon and a beacon frame which is not a part of the expansion beacon. In all of the other cases, the more data bit is set to have a value of 1. This includes frames (except for the last frame) which are a part of the expansion beacon.

Next, a piconet ID (PNID) field includes a unique identifier for a piconet. The piconet ID is usually unchanged during a current instantiation of a piconet and can be maintained during a series of multiple instantiations of a piconet by the same piconet coordinator. The piconet ID is set to be the current piconet ID for a piconet and is used for identifying frames from devices of the piconet.

The MAC frame form includes two device ID fields. These fields are used for representing a source device ID (SrcID) and a destination device ID (DestID). The device ID is unique for a device coupled to one piconet. In the IEEE 802.15.3 standard specification, in order to reduce the overhead of a frame, the physical address of a device uses a device ID of one byte allocated by a piconet coordinator, instead of an MAC address of eight bytes.

Herein, the physical address is a kind of an address for a device on a network and represents a hardware-dependent address. Since the physical address is a hardware-dependent address, a physical address of each device is unique within an entire network. With respect to the WPAN conforming to the IEEE 802.15.3 standard, the MAC address of a device corresponds to a physical address.

A fragmentation control field is used for helping a fragmentation and a recombination of a MAC service data unit (MSDU) and a command frame.

The frame payload field of the frame body is a field which has a variable length and contains information transmitted to a device or a group of devices of a piconet. Further, a frame check sequence field includes a 32-bit CRC.

Figure 6:
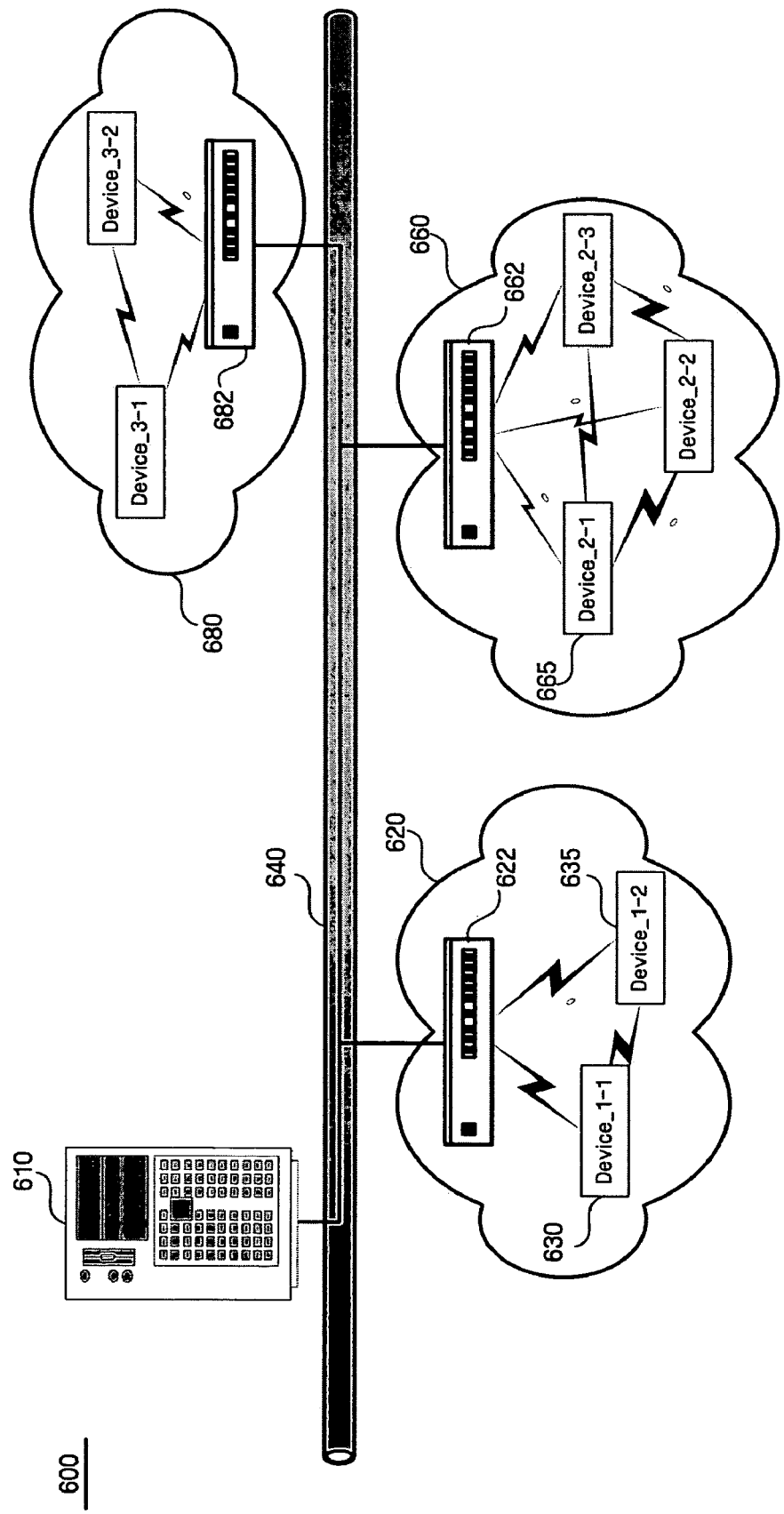
FIG. 6 is a view showing a communication method between WPANs according to an exemplary embodiment of the present invention, which are connected through a backbone network by means of a wired/wireless relay device.

FIG. 6 is a view showing a method of communication between WPANs according to one exemplary embodiment of the present invention, which are connected through a backbone network by means of a wired/wireless relay device.

A network system 600 may include a plurality of piconets 620, 660, and 680, a wired network 640 connected to the piconets, a gateway 610 connected to the wired network 640, and relay devices 622, 662, and 682 connecting the piconets 620, 660, and 680 to the wired network 640. Herein, in order to distinguish the piconets 620, 660, and 680 from one another, the piconet 620 is called a first piconet 620, the piconet 660 is called a second piconet 660, and the piconet 680 is called a third piconet 680.

Further, in order to distinguish the relay devices 622, 662, and 682 from one another, the relay device 622 belonging to the first piconet 620 is called a first relay device, the relay device 662 belonging to the second piconet 660 is called a second relay device, and the relay device 682 belonging to the third piconet 680 is called a third relay device. Herein, the relay device may include a router, a wired/wireless bridge, a device, or a piconet coordinator according to a network topology. For instance, when the relay device is a wired/wireless bridge, the network system 600 forms an IP subnet such as a 192.168.9.x, and each of the piconets 620, 660, and 680 can be distinguished from one another by piconet identification information with which the piconets 620, 660, and 680 can be identified. In the embodiment of the present invention, a wired/wireless bridge is used as a relay device of a wired/wireless network.

Meanwhile, the wired network 640 can conform to any type of wired network protocol based on a medium, which enables communication, such as a coaxial cable, an optical cable, a power line, or a telephone line, etc. Herein, depending upon physical environments to which the present invention is applied, a wired network protocol to which the wired network 640 must conform is determined.

According to an exemplary embodiment of the present invention, for instance, in order for a device 630 to communicate with a device 635, that is, when communication is made in the same piconet, the device 630 and the device 635 have only to conform to the conventional IEEE 802.15.3 standard. However, in order for the device 630 to communicate with a device 665 belonging to the second piconet 660, the first relay device 622 receives a wireless packet transmitted from the device 630. Then, the first relay device 622 generates a wired packet having a structure capable of transmitting information contained in the wireless packet, because a communication protocol structure may change according to a characteristic of a transmission medium and a packet structure may change according to the changed communication protocol structure. The wired packet generated by the first relay device 622 is transmitted to the second relay device 662 through the wired network 640. Herein, the wired packet may be transmitted from the first relay device 622 to the second relay device 662 by a broadcast transmission method or a multicast transmission method. In addition, the wired packet may be directly transmitted to only the second relay device 662 by a predetermined method.

The second relay device 662 converts the wired packet, which has been received from the first relay device 622, into a wireless packet conforming to the IEEE 802.15.3 standard again, experiences a channel time allocation process defined in the IEEE 802.15.3 standard, and then transmits the wireless packet to the device 665.

Herein, a response process for the packet transmitted from the device 630 may be performed between the device 630 and the first relay device 622, between the first relay device 622 and the second relay device 662, and between the second relay device 662 and the device 665. In addition, the response process may also be performed between the device 630 and the device 665.

Figure 7:
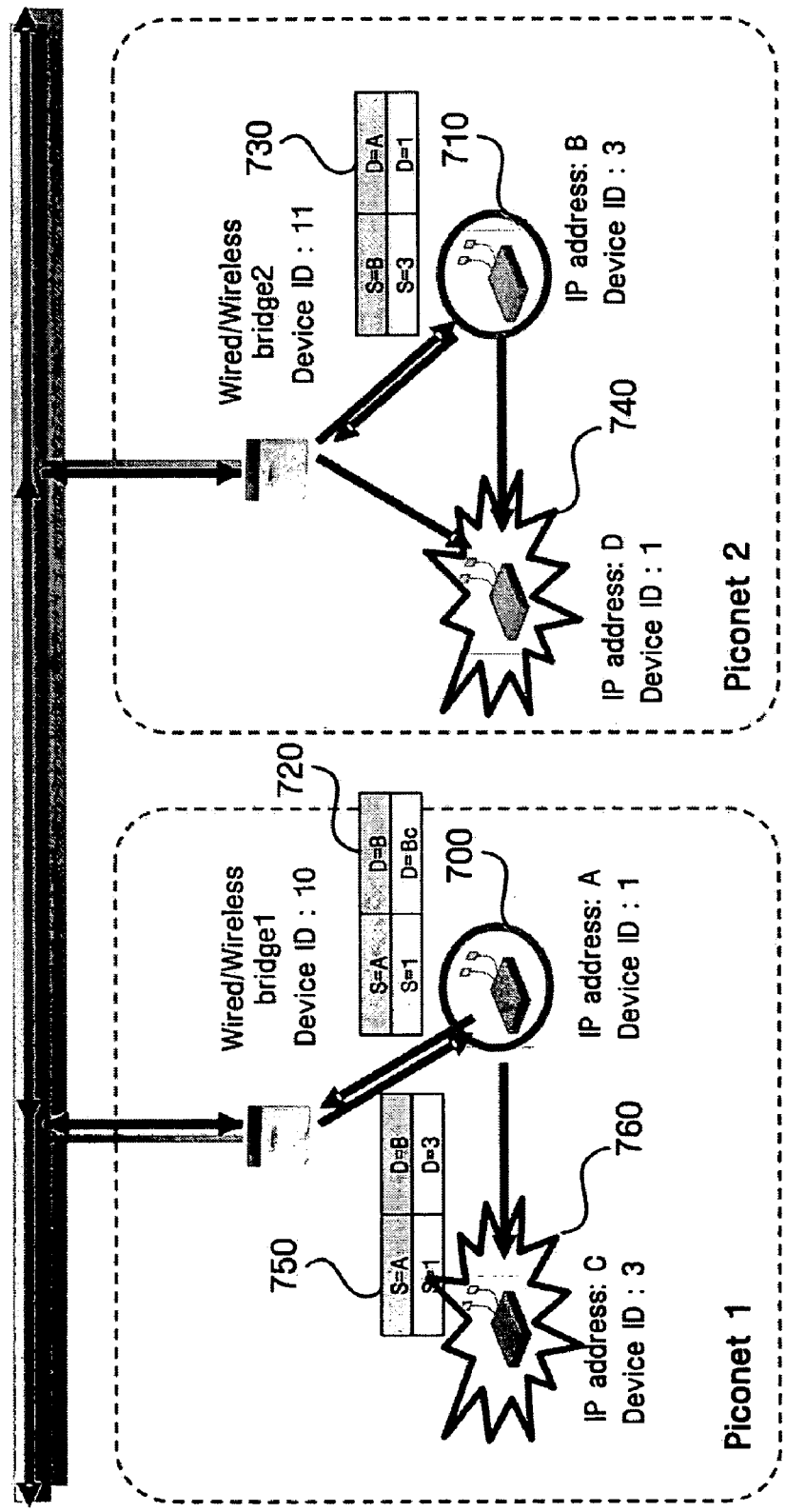
FIG. 7 is a view illustrating a phenomenon caused by an overlap of device IDs in a subnet when communication is performed between WPANs connected through a backbone network.

In the case of WPAN, in order to reduce the overhead of a frame, the physical address of a device uses a unique device ID allocated by a piconet coordinator when the device is associated with the network, instead of an MAC address. The device ID is unique within one WPAN, but may not be unique within a subnet including multiple WPANs connected through a backbone network by means of a wired/wireless relay device as shown in FIG. 6. Such a phenomenon may occur in all coordinator-based wireless networks to which other types of addresses are allocated by a coordinator as the physical address of a device instead of an address (e.g., MAC address) which is unique within an entire network. A phenomenon caused by the overlap of the device ID as described above will be described with reference to FIG. 7.

Further, several protocols may be used in a coordinator-based wireless network. Hereinafter, a case in which IDs of devices in a subnet may overlap will be described, assuming that an IP layer is used on a WPAN.

An operation when a device 700 (hereinafter referred to as "a device A"), which has an IP address "A", in a piconet 1 transmits data to a device 710 (hereinafter referred to as "a device B"), which has an IP address "B", in a piconet 2 which is another WPAN connected through a backbone network is as follows. First, since the device A knows the IP address of the device B but does not know a device ID thereof used as a physical address, the device A broadcasts a frame, that is, an address resolution protocol (hereinafter referred to as "an ARP") request frame 720, requesting a physical address corresponding to the IP address of the device B. The device B in the piconet 2 receives the broadcasted frame and transmits an ARP response frame 730, which contains a device ID "3" used as the physical address of the device B, to the device A having a device ID "1" in response to the broadcasted frame received. Herein, since the ARP response frame may be transmitted (740) to a device D which has the same device ID as that of the device A but belongs to the piconet 2 similar to the device B, an unexpected frame is transmitted to the device D.

Meanwhile, the device A acquires the ID of the device B from the ARP response frame and transmits a data frame 750 comprising its own device ID "1" and the device ID "3" of the device B as a physical address. Herein, since a device C, which has a device ID "3" and an IP address "C", in the piconet 1 has the same ID as that of the device B, the device C may receive an unexpected data frame 760 from the device A.

Such a phenomenon may occur because a WPAN employs a device ID of one byte, which is allocated by a piconet coordinator, as the physical address of a device, instead of an address (e.g., MAC address of eight bytes) which is unique within an entire network. That is, a device ID is unique within each piconet but a device ID is not unique within a subnet including multiple piconets connected to a backbone network by means of a wired/wireless bridge, thus two or more devices can have the same device IDs. Therefore, an unexpected frame may be transmitted to the devices. Accordingly, if data are transmitted between devices belonging to piconets different from each other, when an address (e.g., MAC address of eight bytes) whose uniqueness within an entire network is guaranteed, is used as the physical address of a device, occurrence of this phenomenon can be prevented.

Figure 8:
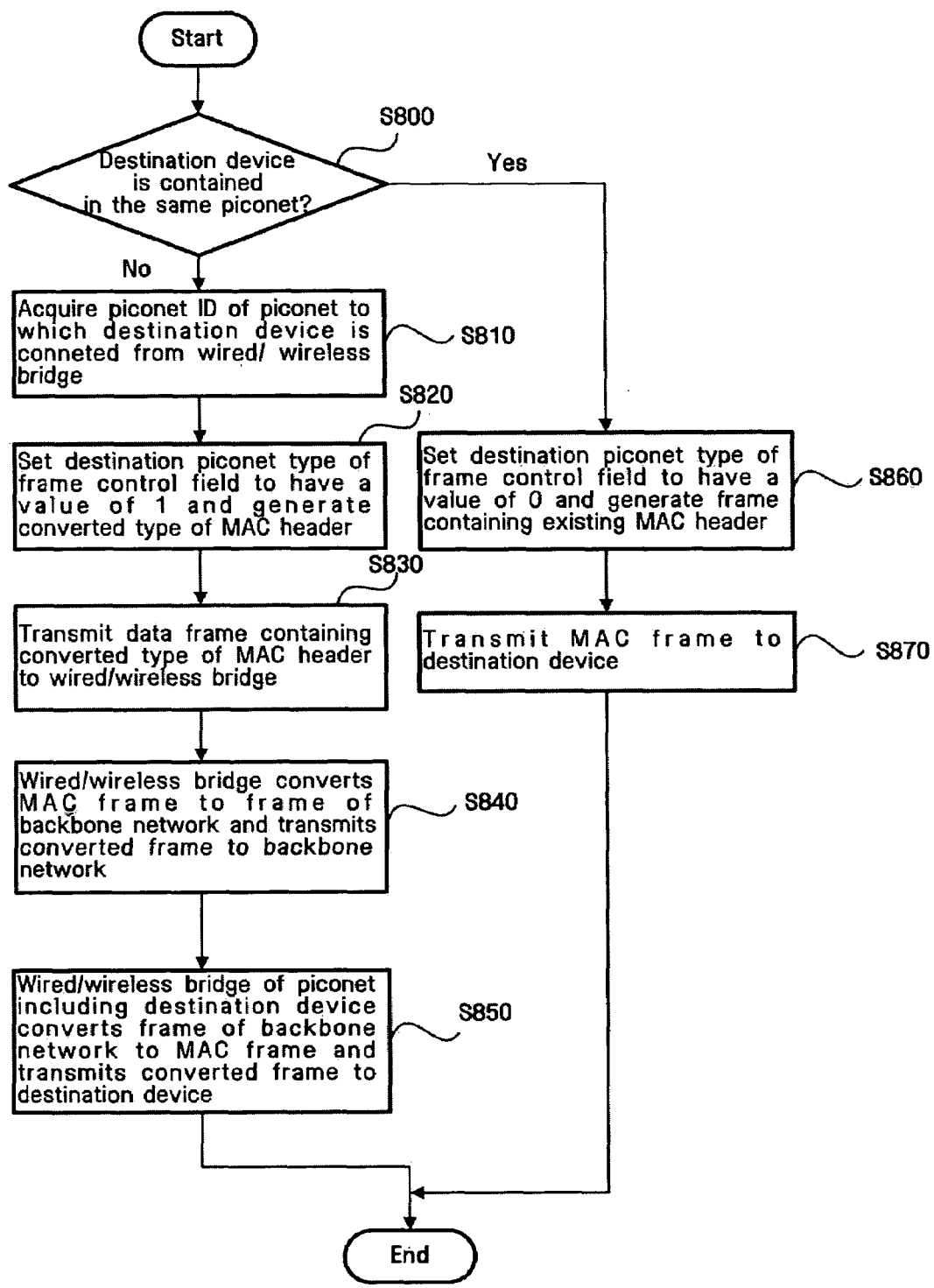
FIG. 8 is a flowchart illustrating a communication method between WPANs, which are connected through a backbone network, using identification information of a WPAN including a destination device according to one exemplary embodiment of the present invention.

FIG. 8 is a flowchart illustrating a communication method between WPANs, which are connected through a backbone network, using identification information of a WPAN including a destination device according to one exemplary embodiment of the present invention.

A source device asks a piconet coordinator "PNC 1" whether or not a destination device is connected to the same piconet (piconet 1) S800. Herein, when the destination device belongs to the piconet 1, the source device sets a destination piconet type 1000 of a frame control field of FIG. 10*a* to have a value of 0 and generates a frame including a MAC header conforming to the conventional 802.15.3 standard shown in FIG. 5 S860. Then, the source device receives a channel time allocated by the piconet coordinator 1 and transmits the MAC frame to the destination device S870.

Figure 10B:
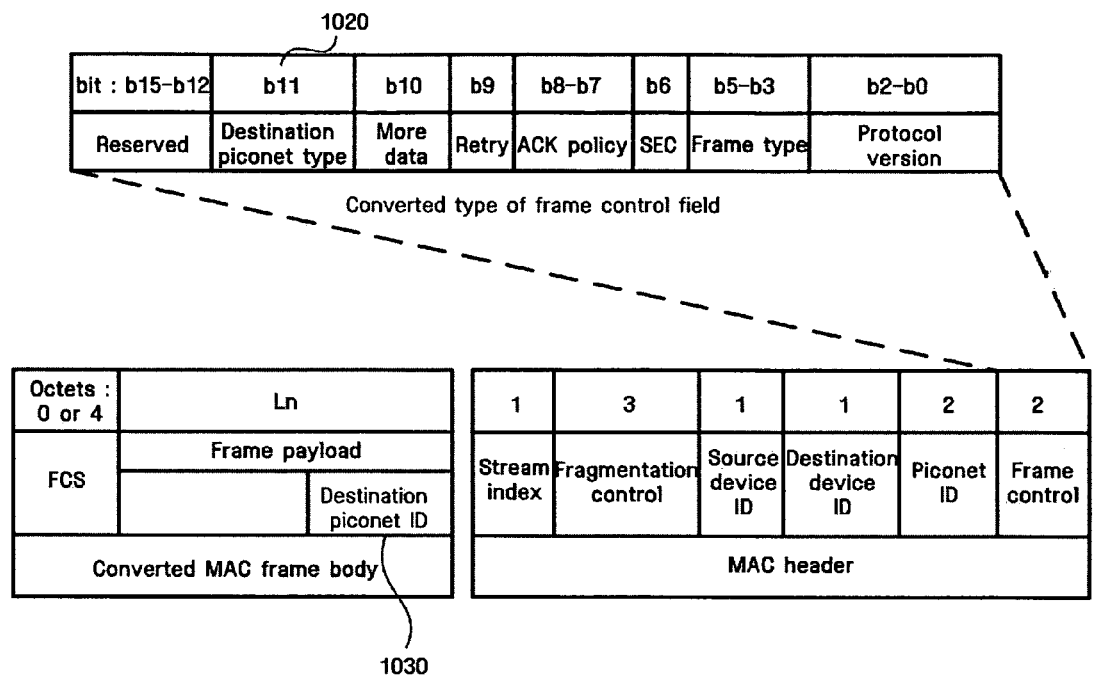

Meanwhile, when the destination device does not belong to a piconet to which the source device belongs, that is, the destination device belongs to the piconet 2, the source device acquires the identification information (e.g., destination piconet ID) of the piconet, to which the destination device is connected, from a wired/wireless bridge connecting the piconet including the source device to the backbone network S810. Then, the source device sets the destination piconet type of the frame control field to have a value of 1, and generates a converted type of MAC header, which uses both a destination device ID and a destination piconet ID as the physical address of the destination device, as shown in FIG. 10 S820. Then, the source device receives the channel time allocated by the piconet coordinator 1 and transmits a MAC frame including the converted type of MAC header to the wired/wireless bridge S830. A structure of the converted type of MAC frame will be described in detail with reference to FIGS. 10*a* and 10*b* later. The destination piconet type described in this embodiment may have a value of 0 or 1. Further, since this value is just for one embodiment of the present invention, it is possible to use any values which enable the destination piconet types to be distinguished from each other.

Hereinafter, step S810, in which the source device acquires the identification information of the piconet to which the destination device is connected, will be described in detail. The wired/wireless bridges connecting the piconet to the backbone network manage identification information (e.g., piconet IDs) of a plurality of piconets. Accordingly, when the destination device is connected to the piconet 2, the source device acquires the identification information (e.g., piconet ID) of the piconet 2, to which the destination device is connected, from the wired/wireless bridge connecting the piconet including the source device to the backbone network, and provides an MAC frame using a combination of the destination device ID and the destination piconet ID as the physical address of the destination device. Herein, in order to solve the phenomenon caused by the device IDs being overlapped as described with reference to FIG. 7, unique identification information for each of multiple piconets must be allocated respectively. Herein, a method for uniquely allocating the identification information of a piconet will be described with reference to FIGS. 9*a* and 9*b* later.

The wired/wireless bridge having received the MAC frame from the source device converts the frame conforming to the IEEE 802.15.3 standard to a frame supported by a protocol of a backbone network, and transmits the converted frame to the backbone network S840.

A wired/wireless bridge of a reception-side piconet (piconet 2) converts the frame received from the backbone network to a frame supported by the IEEE 802.15.3 standard, and transmits the converted frame to the destination device (S850).

Herein, a channel time allocation for frame transmission in the piconet 2 may be problematic. That is, according to the IEEE 802.15.3 standard, a device capable of requesting the channel time allocation must be a source device intended to transmit data. Accordingly, when a destination device intended to receive data belongs to a different piconet from the piconet to which the source device belongs, a mechanism for performing a channel time allocation for data reception is required.

In one exemplary embodiment for performing such a mechanism, a parameter to indicate whether a device requesting a channel time allocation is a source device or a destination device, is added to a message called when the channel time allocation is requested, so that the destination device can also request the channel time allocation. Herein, a destination device requesting a channel time allocation receives multiple information for a channel time allocation in advance from a middleware or an application operating in upper layers of a MAC layer.

Figure 9A:
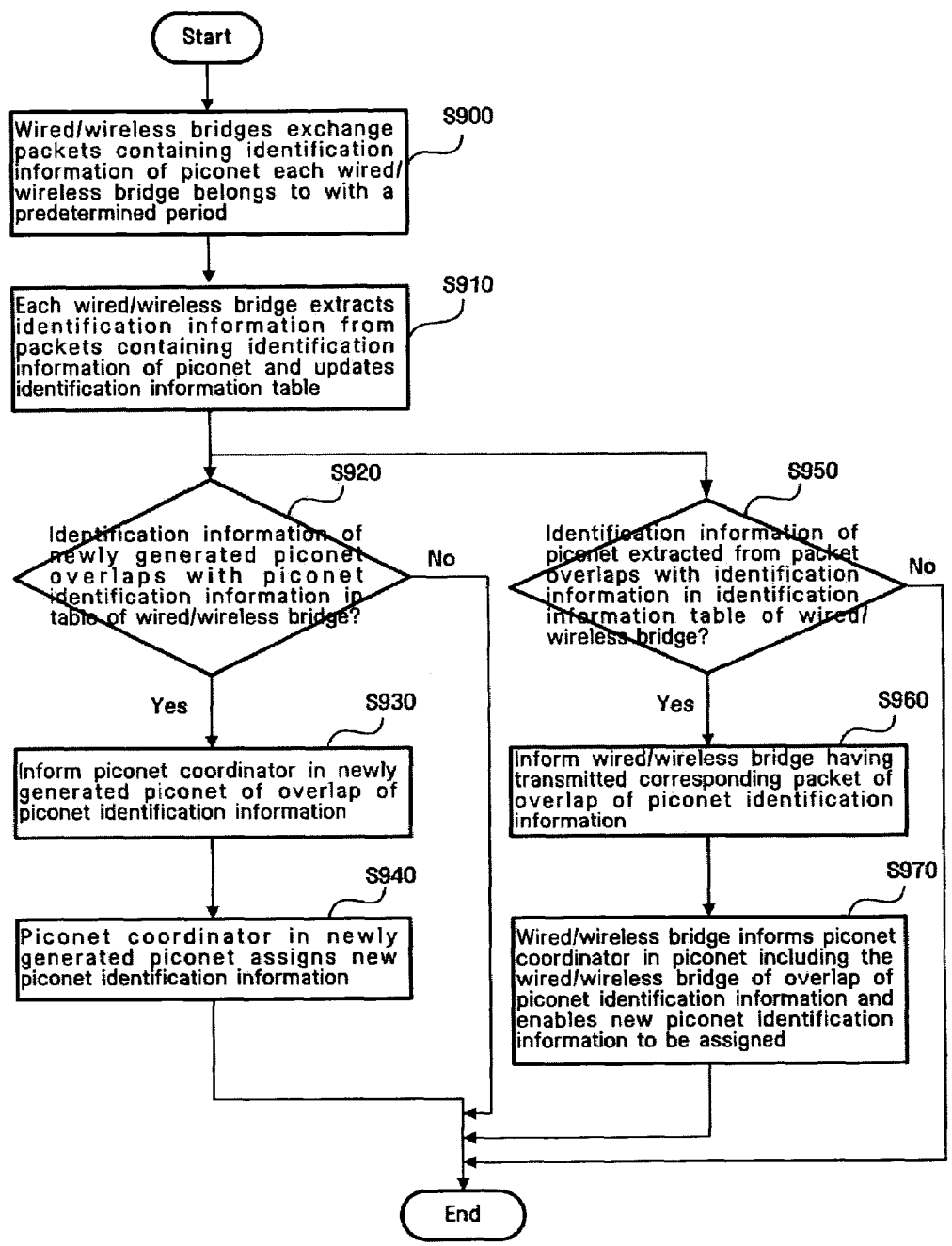
FIG. 9a is a flowchart illustrating a method of allocating unique identification information to each piconet.

FIG. 9a is a flowchart illustrating a method for uniquely allocating identification information to each piconet.

A plurality of wired/wireless bridges connecting a piconet to a backbone network periodically provide the backbone network with packets containing identification information of a piconet to which each wired/wireless bridge belongs, thereby informing other wired/wireless bridges of the identification information of the piconet to which each wired/wireless bridge belongs S900. Then, each wired/wireless bridge extracts identification information of other piconets from the packets, which contain the identification information of the piconets and have been transmitted from other wired/wireless bridges, and updates a piconet identification information table managed by each wired/wireless bridge S910.

Herein, it is assumed that a specific device tries to generate a piconet while a certain wired/wireless bridge belongs to no piconet. When identification information of the newly generated piconet overlaps with piconet identification information stored in a table, a wired/wireless bridge belonging to the newly generated piconet informs a piconet coordinator in the newly generated piconet that the piconet identification information is overlapped S930. Herein, a structure of information elements used for reporting overlapping of the piconet identification information will be described with reference to FIG. 9b later. The piconet coordinator, which has determined that the identification information of the newly generated piconet overlaps with the already stored identification information, generates new piconet identification information, for instance, a piconet ID S940.

Meanwhile, in another exemplary embodiment of the present invention, when overlapping of piconet identification information occurs, a wired/wireless bridge enables a piconet, to which the wired/wireless bridge does not belong, to generate new piconet identification information which does not overlap with another identification information. The determination as to whether piconet identification information is overlapped may be performed when wired/wireless bridges exchange packets, which contain identification information of a piconet to which each wired/wireless bridge belongs, with each other, and updates a piconet identification information table managed by each wired/wireless bridge S950. A wired/wireless bridge extracts identification information from the received packet containing the piconet identification information, and compares the extracted identification information with identification information managed in a table. From the result of the comparison, when the extracted identification information overlaps with the identification information managed in the table, the wired/wireless bridge transmits to the wired/wireless bridge that sent the initial packet an information element indicating overlapping of the piconet identification information S960. The wired/wireless bridge having received the information element transmits the information element to a piconet coordinator in a piconet to which the wired/wireless bridge belongs, and enables the piconet coordinator to generate new piconet identification information S970.

FIG. 9b is a view showing a structure of an information element according to one exemplary embodiment of the present invention, which is sent from a wired/wireless bridge to a piconet coordinator when piconet IDs overlap with each other in a WPAN.

In an exemplary embodiment for a mechanism of reporting the overlap of piconet IDs, a WPAN uses an overlapping PNID (piconet ID) information element. This information element is used when a device communicates piconet IDs detected from its own channel or other channels, and the overlapping PNID information element has a structure as shown in FIG. 9b.

Herein, an overlapping PNID information element is originally used in the following case: when a device has the same piconet ID in a current channel but receives a beacon from another piconet having a different piconet coordinator address, the device adds a corresponding piconet ID and a channel index to the information element, and then informs a piconet coordinator that the piconet IDs are overlapped. Accordingly, in an exemplary embodiment of the present invention, a wired/wireless bridge can use an overlapping PNID information element in order to report the overlap of piconet IDs.

FIGS. 10a and 10b are views showing a structure of a converted frame according to one exemplary embodiment of the present invention, which contains identification information of a WPAN to which a destination device belongs.

In performing a communication mechanism as shown in FIG. 8, a frame conforming to the conventional IEEE 802.15.3 standard has an insufficient structure. Accordingly, in order to perform the present invention, it is necessary to modify the structure of the frame conforming to the conventional IEEE 802.15.3 standard. Further, the modification of the frame structure may vary according to the kinds of relay devices 622, 662, and 682. Herein, the present invention uses wired/wireless bridges as the relay devices 622, 662, and 682 and proposes a new frame structure according to use of the wired/wireless bridges.

In FIG. 10a, one reserved bit 1000 of a frame control field of a MAC header is used as a bit representing a destination piconet type. When a destination device belongs to a piconet different from that to which a source device belongs, the destination piconet type is set to have a value of 1. When a destination device belongs to a piconet to which a source device belongs, the destination piconet type is set to have a value of 0. Meanwhile, the destination piconet type described in the embodiment may have a value of 0 or 1. Further, since this value is only for one exemplary embodiment of the present invention, it is possible to use values with which the destination piconet types can be distinguished from each other.

When the destination piconet type has a value of 0, the frame structure shown in FIG. 5 conforming to the conventional IEEE 802.15.3 standard is used as it is. When the destination piconet type has a value of 1, the frame structure conforming to the conventional IEEE 802.15.3 standard is modified to add a destination piconet ID to the MAC header including a source device ID, a destination device ID, and a piconet ID.

In another exemplary embodiment of the present invention for a new frame structure, as shown in FIG. 10b, a destination piconet ID may be inserted into not an MAC header but a payload of a frame body. Herein, using one reserved bit 1020 of the frame control field of the MAC header as a bit representing a destination piconet type is equal to the embodiment of FIG. 10a. However, only when the destination piconet type has a value of 1, the destination piconet ID is inserted into the payload of the frame body as a part 1030 of data.

Each of the destination devices having overlapped IDs receives a frame in which a destination device ID of an MAC header is equal to an ID of each destination device. Further, when the destination piconet type 1020 of the frame control field of the MAC header has a value of 1, each destination device confirms whether or not the destination piconet ID 1030 of the payload of the frame body coincides with an ID of a piconet to which each destination vice belongs. From the result of confirmation, when the destination piconet ID 1030 does not coincide with the ID of the piconet, each destination device discards a corresponding frame. But, only when the destination piconet ID 1030 coincides with the ID of the piconet, each destination device processes a corresponding frame.

Figure 11:
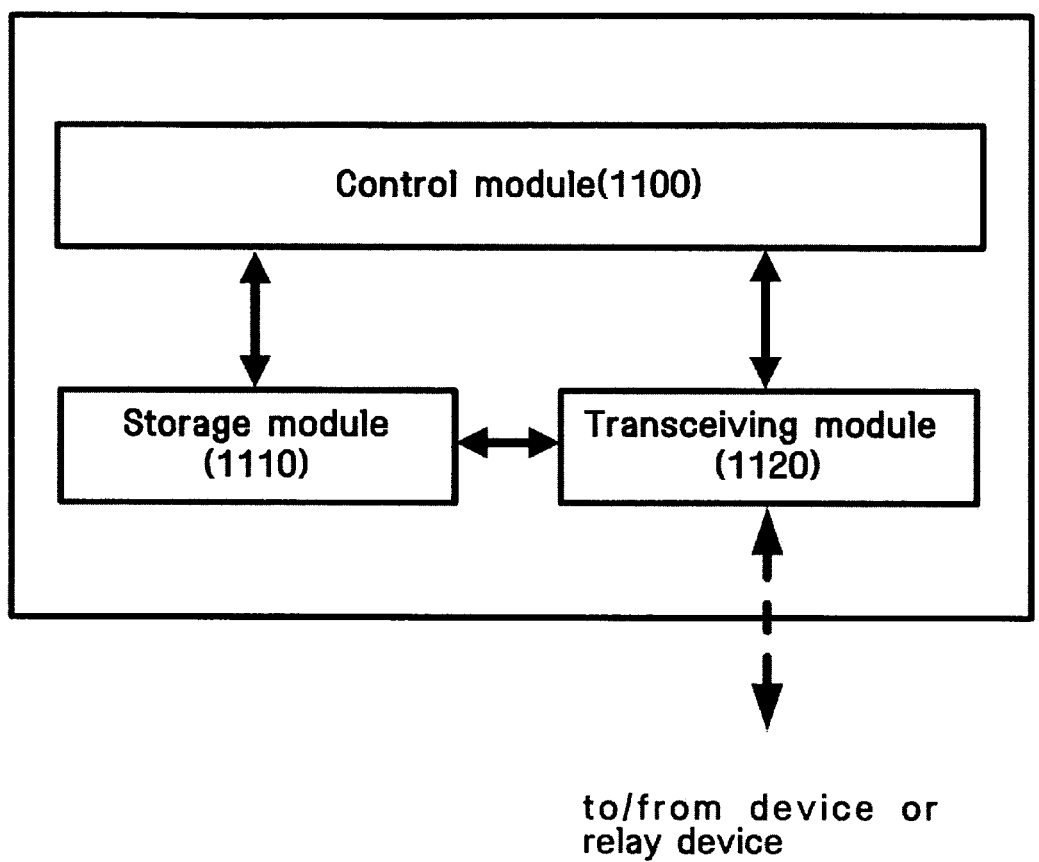
FIG. 11 is a block diagram showing a structure of a network device according to one exemplary embodiment of the present invention.

FIG. 11 is a block diagram showing a structure of a network device according to one exemplary embodiment of the present invention.

The wireless network device according to one exemplary embodiment of the present invention includes a control module 1100, a transceiving module 1120, and a storage module 1110.

The term "module" used in the present embodiment refers to a software element or a hardware element, such as a field programmable gate-array (FPGA) or an application-specific integrated circuit (ASIC), and the module performs its role as predetermined. However, the module is not limited to software or hardware. Further, the module may be constructed to exist in an addressable storage module, or to reproduce one or more processors. For instance, the module can include elements (e.g., software elements, object-oriented software elements, class elements and task elements), processors, functions, properties, procedures, subroutines, segments of a program code, drivers, firmware, a microcode, a circuit, data, a database, data structures, tables, arrays, and variables. Herein, functions provided by elements and modules may be provided either by combination of a smaller number of elements and modules or with additional elements and modules. In addition, elements and modules may be realized to reproduce one or more CPUs in a network device.

In the case of a control module of a source device, the control module 1100 acquires identification information of a coordinator-based wireless network to which a destination device belongs from a relay device connecting a coordinator-based wireless network, to which a source device belongs, to a backbone network. Then, the control module 1100 generates a frame containing the acquired identification information. In the case of a control module of a receiving device, the control module 1100 plays a role of extracting identification information of a piconet from a frame received by a transceiving module, and processing the received frame according to the extracted identification information.

The transceiving module 1120 transmits or receives the frame, which has been generated by the control module 1100, containing the identification information of a coordinator-based wireless network.

The storage module 1110 stores therein the frame generated by the control module, the frame processed by the control module, or the frame received from the transceiving module.

Figure 12:
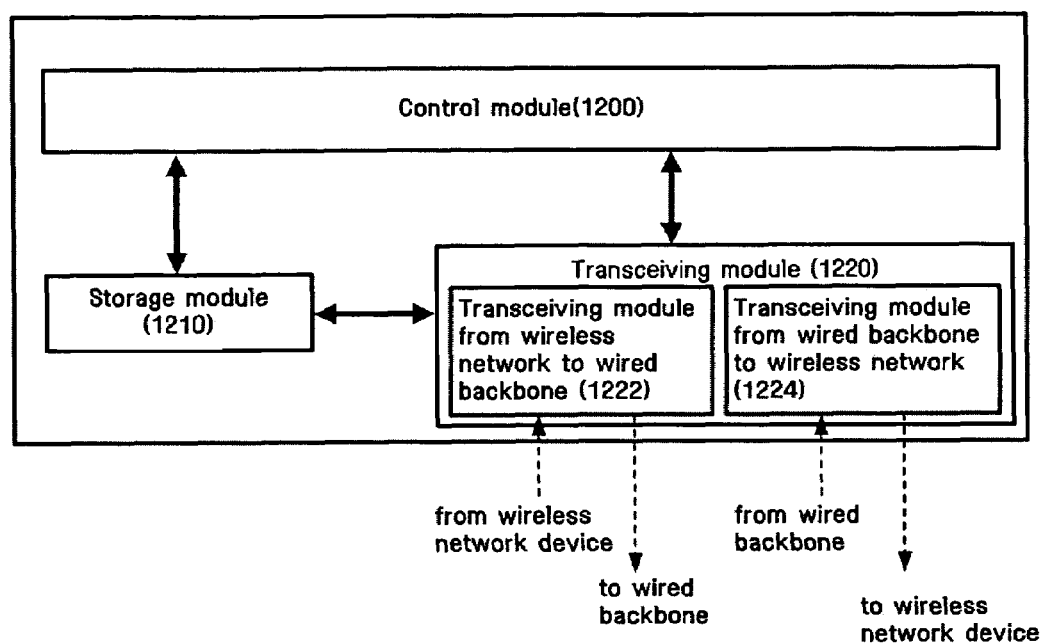
FIG. 12 is a block diagram showing a structure of a wired/wireless relay device according to one exemplary embodiment of the present invention.

FIG. 12 is a block diagram showing a structure of a wired/wireless relay device according to one exemplary embodiment of the present invention.

The wired/wireless relay device includes a control module, a transceiving module, and a storage module.

The transceiving module 1220 includes a first transceiving module 1222 and a second transceiving module 1224. The first transceiving module 1222 receives a frame from a coordinator-based wireless network to transmit the received frame to a wired network. The second transceiving module 1224 receives the frame from the wired network to transmit the received frame to the coordinator-based wireless network.

In the case of a control module of a relay device in a coordinator-based wireless network to which a source network device belongs, the control module 1200 manages identification information of the coordinator-based wireless network, and converts the frame of the coordinator-based wireless network, which has been received from the transceiving module, to a frame supported by a backbone network. In the case of a control module of a relay device in a coordinator-based wireless network to which a destination network device belongs, the control module 1200 manages identification information of the coordinator-based wireless network, and converts the frame of the coordinator-based wireless network, which contains the identification information of the coordinator-based wireless network and has been received from the transceiving module, to a frame supported by the backbone network.

The storage module 1210 stores the frame provided by the transceiving module or the frame converted by the control module, because, when frames, which can be transmitted at one time from the coordinator-based wireless network and the backbone network, are different in size, it is necessary to adjust their sizes and temporarily store the frames for conversion between frame types supported by the coordinator-based wireless network and the backbone network. Also, the storage module 1210 stores the identification information of the coordinator-based wireless network managed by the control module.

As described above, according to a method and an apparatus for communication between coordinator-based wireless networks connected through a backbone network, one or more effects are achieved as follows.

First, communication between various different coordinator-based wireless networks is performed, thereby expanding the communication area of the coordinator-based wireless network.

Secondly, unique identification information can be allocated between various different coordinator-based wireless networks.

Thirdly, in the case of communication between devices belonging to various different coordinator-based wireless networks, a device ID and a piconet ID by combination thereof is used as physical addresses of a source device and a destination device, thereby solving a phenomenon which may occur when the physical addresses of the devices allocated by a coordinator overlap with each other.

Exemplary embodiments of the present invention have been described for illustrative purposes, and those skilled in the art will appreciate that various modifications, additions and substitutions are possible, without departing from the scope and spirit of the invention as disclosed in the accompanying claims.

What is claimed is:

1. A method for communicating between coordinator-based wireless networks connected through a backbone network, comprising:
managing identification information of multiple coordinator-based wireless networks;
providing a network device with the identification information of a coordinator-based destination wireless network to which a destination network device belongs;
converting a frame containing the identification information, which has been received from the network device, to a frame supported by the backbone network; and
transmitting the convened frame to the backbone network,
wherein the managing of the identification information comprises:
providing the backbone network with a packet containing the identification information of a the coordinator-based destination wireless network within a predetermined period;
receiving a packet containing the identification information of another coordinator-based wireless network from the backbone network, extracting the identification information from the received packet, and updating the identification information; and
informing a coordinator in the coordinator-based destination wireless network of overlapping information when the identification information of the coordinator-based destination wireless network overlaps with already managed identification information of said another coordinator-based wireless network.

2. The method as claimed in claim 1, wherein the managing of the identification information comprises:
providing the backbone network with a packet containing the identification information of the coordinator-based destination wireless network within a predetermined period;
receiving a packet containing the identification information of another coordinator-based wireless network from the backbone network, extracting the identification information from the packet, and updating the identification information; and
informing a relay device in a corresponding coordinator-based wireless network of overlapping information when the identification information of the packet received from the backbone network overlaps with already managed identification information of said another coordinator-based wireless network.

3. The method as claimed in claim 1, further comprising storing the frame received from the network device before transmitting the received frame to the backbone network.

4. A method for communicating between coordinator-based wireless networks connected through a backbone network, comprising:
managing identification information of multiple coordinator-based wireless networks;
converting a frame containing the identification information received from a backbone network to a frame supported by a coordinator-based wireless network; and
transmitting the converted frame to a network device in the coordinator-based wireless network,
wherein the managing of the identification information comprises:
providing the backbone network with a packet containing the identification information of a coordinator-based wireless network within a predetermined period;
receiving a packet containing the identification information of another coordinator-based wireless network from the backbone network, extracting the identification information from the received packet, and updating the identification information; and
informing a coordinator in the coordinator-based wireless network of overlapping information when the identification information of the coordinator-based wireless network overlaps with already managed identification information of said another coordinator-based wireless network.

5. The method as claimed in claim 4, wherein the managing of the identification information comprises:
providing the backbone network with a packet containing the identification information of a coordinator-based wireless network within a predetermined period;
receiving a packet containing the identification information of another coordinator-based wireless network from the backbone network, extracting the identification information from the received packet, and updating the identification information; and
informing a relay device in a corresponding coordinator-based wireless network of overlapping information when the identification information of the packet received from the backbone network overlaps with already managed identification information of said another coordinator-based wireless network.

6. The method as claimed in claim 4, further comprising storing the frame received from the backbone network before transmitting the received frame to the network device in the coordinator-based wireless network.

* * * * *